US006182174B1

(12) United States Patent
Kark et al.

(10) Patent No.: US 6,182,174 B1
(45) Date of Patent: Jan. 30, 2001

(54) MEMORY CARD INTERFACE METHOD USING MULTIPLEXED STORAGE PROTECT KEY TO INDICATE COMMAND ACCEPTANCE

(75) Inventors: Kevin W. Kark; William Wu Shen, both of Poughkeepsie; Russell W. Lavallee, LaGrangeville, all of NY (US); Udo Wille, Holzgerlingen (DE); Hartmut Ulland, Altdorf (DE); Walter Lipponer, Ammerbuch (DE)

(73) Assignee: International Business Machines Corporation, Armonk, NY (US)

( * ) Notice: Under 35 U.S.C. 154(b), the term of this patent shall be extended for 0 days.

(21) Appl. No.: 09/059,221

(22) Filed: Apr. 13, 1998

(51) Int. Cl.[7] .............................. G06F 13/42; G06F 13/00
(52) U.S. Cl. ......................... 710/105; 711/164; 711/115
(58) Field of Search ................................... 711/115, 163, 711/164, 167; 710/105

(56) References Cited

U.S. PATENT DOCUMENTS

| 4,038,645 | 7/1977 | Birney et al. .................. 711/206 |
| 4,366,537 | 12/1982 | Heller et al. .................. 711/164 |
| 4,500,952 | 2/1985 | Heller et al. .................. 711/206 |
| 5,163,096 | * 11/1992 | Clark et al. .................. 711/115 |
| 5,499,346 | * 3/1996 | Amini et al. .................. 711/115 |
| 5,634,015 | * 5/1997 | Chang et al. .................. 711/167 |
| 5,828,835 | * 10/1998 | Isfeld et al. .................. 711/115 |

OTHER PUBLICATIONS

Ekanadham et al, "Multisequencing A Single Instruction Stream–Storage Protect Key Register," IBM Tech. Disc. Bull., vol. 36, No. 6A, Jun. 1993, pp. 269–271.*

* cited by examiner

Primary Examiner—Glenn Gossage
(74) Attorney, Agent, or Firm—Lynn L. Augspurger

(57) ABSTRACT

A memory interface between the storage controller and memory card of an S/390 system uses the S/390 Storage Protect (SP) Key as an indication or protocol of storage command acceptance by the memory card. When the SP key is returned, then the command is deemed to be accepted by the memory card and the key will be used by the processor for its storage validation in accordance with the S/390 architecture. In the event that the memory card detected an error associated with the command, it will then return an error response code via a memory status bus. The memory status bus is multiplexed to service the existing architected requirement as well as an indicator of handshaking between the memory controller and the memory card.

2 Claims, 2 Drawing Sheets

MEMORY CARD INTERFACE METHOD USING MULTIPLEXED STORAGE PROTECT KEY TO INDICATE COMMAND ACCEPTANCE

FIELD OF THE INVENTION

This invention is related to computers and computer system memories and in particular to the interfaces between a memory controller and memory card of an S/390 system computer system memory.

BACKGROUND

Any mainframe such as a S/390 compatible system, which uses a storage protection (SP) key and uses a command response (handshake) type bus between the processor and memory, provides an interface to memory or main store. Processor to memory (or Main Store MS) interfaces have always existed in the computer industry. There are many ways to define the communication protocol or handshake between the sender and receiver on both sides of the bus for memory accesses. A typical example of processor to memory protocol includes Command Accept, Fetch Data Alert, Store Complete with additional protocols for bus management if the data bus is a bi-directional bus.

These protocols may require separated hardware signals or the protocol may be embedded with an existing bus and time shared control signals are passed with other existing signals like data bus or command bus signals. These other solutions require extra hardware signal lines and/or restrict the performance in order to mix with control signals on an existing bus which can handle the interface handshake. Separated hardware signals means more hardware lines and more input/output (IO) from chips and modules. Timing sharing with other signals also presents a restriction and limits functional usage.

SUMMARY OF THE INVENTION

This invention provides a way for the S/390 memory card to return its SP key data as an indication the command was "accepted" by the memory card while the SP key is returned to the requestor for storage validation. Had the memory card detected an error, it would have indicated an error status response using the same bus. Therefore, we multiplex the Key Return, Command Acceptance, Error Reporting, and Data Return onto one Memory Status Bus without having separate signal lines for all these conditions.

By using an existing architected function, the SP key communication protocol and the memory command response protocol are merged together, providing support for each function without exposure to any control restriction or performance limitation.

These and other improvements are set forth in the following detailed description. For a better understanding of the invention with advantages and features, refer to the description and to the drawings.

DETAILED DESCRIPTION OF THE INVENTION

In the current IBM Enterprise System Architecture (ESA/390 architecture) used for the System/309 (S/390 is the registered trademark of IBM for computer systems, used in connection with large servers and using a S/390 architecture), the Storage Protect Key (SP key) is the Storage Key as defined by the S/390 Architecture and which includes the following: A 4-bit SP key, A Reference Bit, A Change Bit and a Fetch Protection Bit. These 7 bits of the SP key field protect a single page (4Kbyte) of storage data. The SP key needs to be accessed, compared and modified for every memory operation related to operation system usage.

Figure 1:
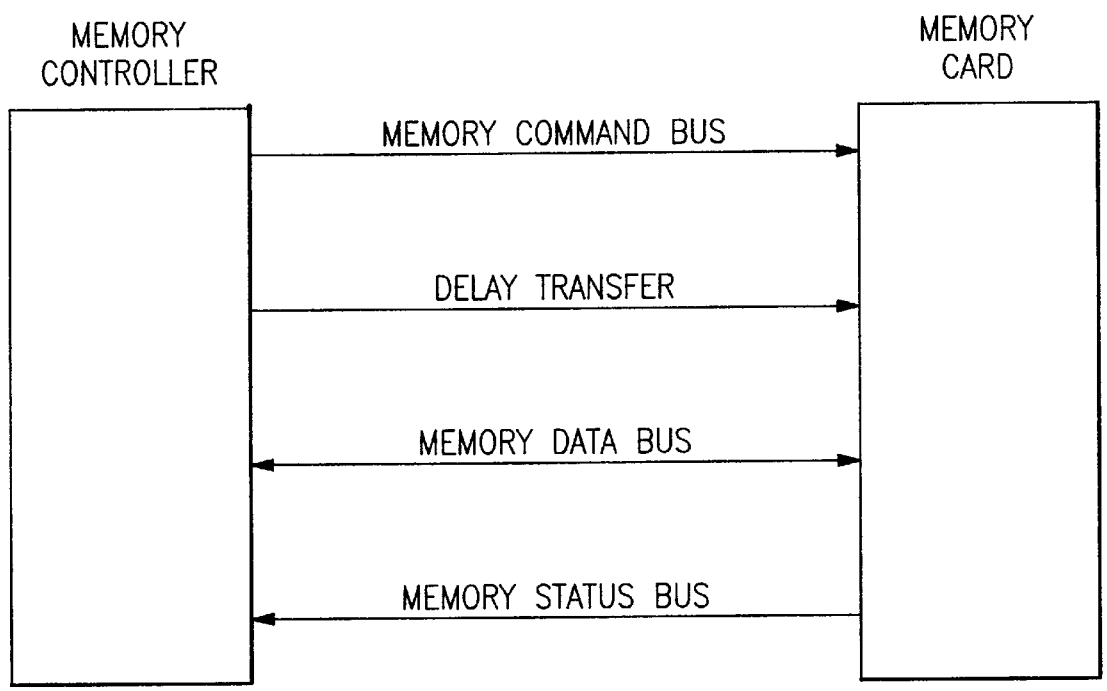
FIG. 1 shows an S/390 computer.

Since the SP key access is necessary for every memory operation and the SP key needs to be fetched from a memory card, we have used this aspect of the ESA/390 architected S/390 system and use the SP key bus to share controls with the essential memory status as part of our bus command response protocol (handshake) method in our preferred embodiment. In the embodiment illustrated by FIG. 1 showing the relationship of the S/390 processor's memory controller and the memory card utilized in the present process or method of interfacing the card to the memory controller, the bi-directional data bus transfers memory commands via the memory command bus and delay transfer signals via the delay transfer bus to the memory card, and the memory card returns memory data and memory status via the related portion of the bi-directional bus.

Memory Status Bus Definition

The status bus is used for both the return of the SP key and he status of the operation the memory card is executing.

It is an 8-bit bus (bit 0 through bit 7). If bit 7 is ON, then the bus is returning a SP key which is a 7-bit facility, occupying bit 0 through 6 of the Memory Status Bus. On the other hand, if Bit 7 of the Memory Status Bus is OFF, then it signifies encoded responses from the memory cards such as Fetch Alert, Store Completion, Error etc. Please refer to Table 1 to 4 for further detail.

Since the Memory Status Bus is used for SP key return as well as other memory responses such as Fetch Alert, Store Completion and Encoded Error Response, the following priority is applied: Fetch Alert status has highest right to use the bus, followed by returning of the storage protect (SP) key, which also acts as the command accept handshake, then follows the store completion status. Please refer to FIG. 2 for detail.

TABLE 1

| Memory Status Bus Definition when Bit 7 is ON | | | | |
|---|---|---|---|---|
| Memory Status Bus Bit 0 to 3 | Memory Status Bus Bit 4 | Memory Status Bus Bit 5 | Memory Status Bus Bit 6 | Memory Status Bus Bit 7 is ON |
| Store Protect Key | Fetch Protection Bit | Reference Bit | Change Bit | Yes |

TABLE 2

Memory Status Bus Definition when Bit 7 is OFF

| Memory Status Bus Bit 0 | Memory Status Bus Bit 1 to 2 | Memory Status Bus Bit 3 to 6 | Memory Status Bus Bit 7 is Off |
|---|---|---|---|
| Reserve | Memory Bank ID (see separation table for detail) | Action Code (see separate table for detail) | Yes |

TABLE 3

Action Code Definition

| Action Code | Meaning |
|---|---|
| '0000 | Idle |
| '0001 | Fetch Alert Indicator |
| '0010 | Store Completion Indicator |
| '1100 | SP Key Array Error Check |
| '1111 | Command Parity Check |

TABLE 4

Memory Bank ID Definition

| Memory Bank ID | Meaning |
|---|---|
| '00 | Memory Bank 0 |
| '01 | Memory Bank 1 |
| 10 | Memory Bank 2 |
| 11 | Memory Bank 3 |

Remark

Action code "0001", is 'fetch alert' to inform the processor that the requested fetch data are coming. Action code "0010" is 'store complete' which indicates the memory card has completed a requested store operation.

When "1111" action code happens and there is no clock stop condition, the processor can assume that the array on the memory card has not been altered so that a retry action can take place. For a fetch command action code of "1111", the memory card will send back a Fetch Alert accompanying an 8 cycle window of dummy data. The Fetch Alert is used by the processor to indicate that the memory card is free, so that a retry of the current fetch request can begin.

MS-Processor Card Interface and Handshakes

A processor sends commands on its command bus. The fastest repetition rate from one command to the second command is determined to be 8 cycles minimum (i.e. from first command cycle to next command cycle, and at a minimum there must be a 7 cycle gap). This is a requirement since there is a minimum of an 8 cycle window of data on the bi-directional data bus per command requested. The data bus is the limiting factor before the next command can be sent to the memory card. There is no maximum cycle limit.

Command Accept Handshake

Figure 2:
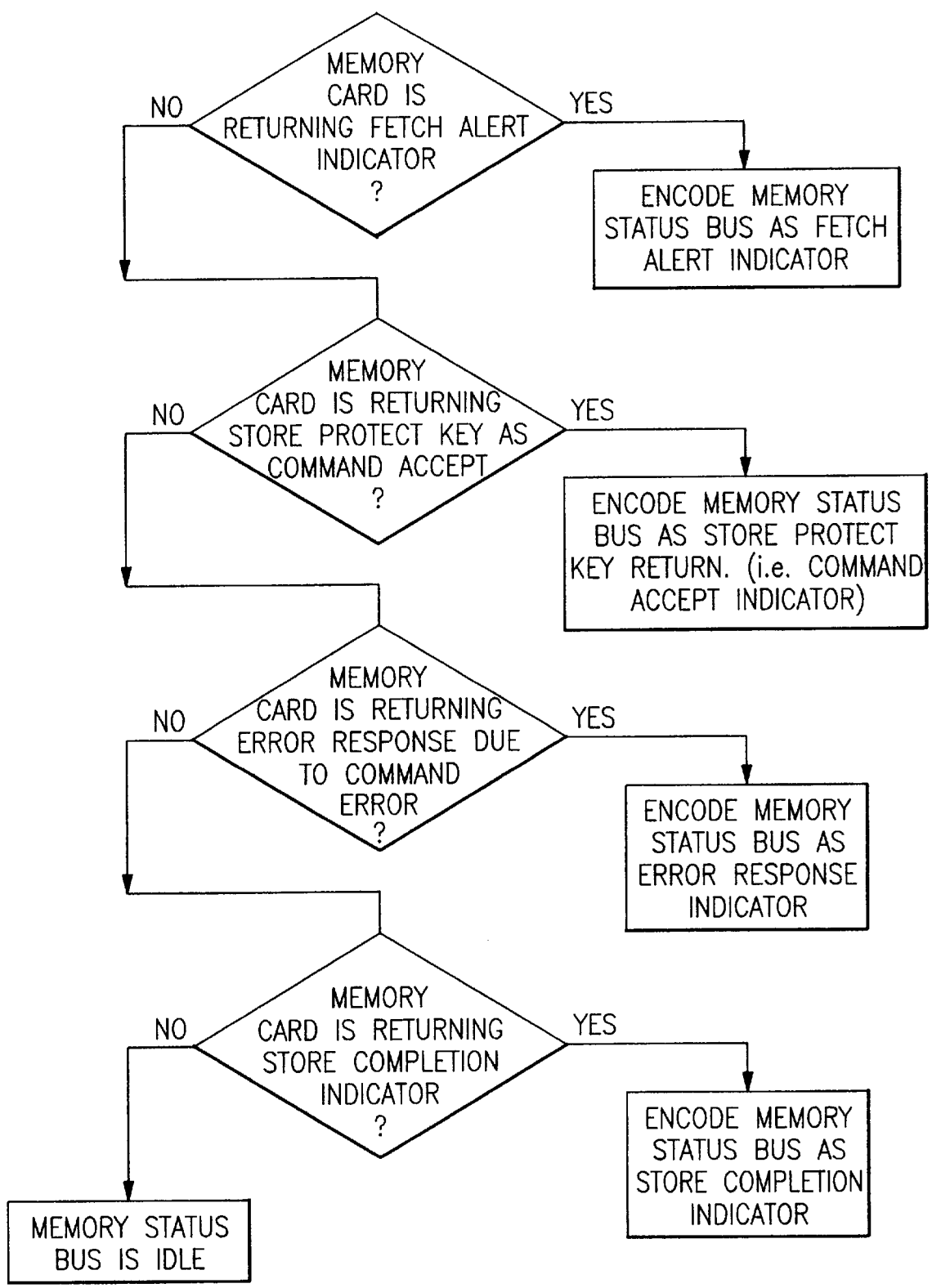
FIG. 2 is a flowchart of a process or method for interfacing a memory card and memory controller in the system of FIG. 1 according to a preferred embodiment of the invention.

For any command that is issued, there is a corresponding handshake window on the status bus 9 cycles later. We call this window a key response cycle, because unless there is other status information which has higher priority, this is the cycle the SP key is returned as an indication of Command Accept. In the case that there are priority conflicts and another status information gets placed on the bus, the key response will just be delayed to the next cycle. A Fetch Alert is the only kind of status which has a higher priority than a SP key return, because it has to be on the status bus with a fixed relationship to the data on the data bi-directional bus. FIG. 2 shows the flow diagram of the process wherein the memory controller of the processor determines whether or not the memory card is returning a Fetch Alert indicator. The other steps used in the interface are generally set out in FIG. 2, and described more particularly herein.

If a command has been received and the SP key contents at a requested address has a SP key error, a key error status will be returned as a response to the processor at the response cycle.

If there is neither a SP key nor any key error status at the handshake window, and there is no other status which has a higher priority, this will mean that a portion of the memory card is malfunctioning and a machine check should be issued.

The SP key return is valid even for the commands that do not relate to key functions. There will be a dummy SP key at the key response cycle in order to complete the handshake.

Memory Status Bus used as a Key Return/Command Accept Indicator

The processor will use the SP key for storage validation. In the event the command has an error, the status bus would return an error response code which would describe the type of error being detected. See the timing relationships between Memory Command Bus and Memory Status Bus where the status returns a S/390 Store Protect Key which is used as an indication for the command being accepted by the memory card as shown in the next timing diagram for detail.

```
                         System Cycle 1111111111  2222222222
                         123456789  0123456789  0123456789
Memory Command Bus       CCC......  ..........  ..........
                         CCC......  ..........  ..........
                         .........  ..........  ..........
Memory Status Bus        .........  S.........  ..........

Legend:
C = Active Memory Command Bus for 3 cycles
S = Active Memory Status
.... = No Activity
```

Data Fetch Command

Data fetch commands are issued through the command bus. When the data is ready to be sent back to the memory controller, there is a Fetch Alert status sent to prepare the processor's receiving register and buffer.

Fetch Alert Status

This status is sent at the 5th cycle in advance of the fetch data being returned on the bi-directional data bus (which may be referred to as "bidi data bus" or simply "bidi bus" for short. The fetch alert status also contains a requestor identification (ID) which can be used to identify the ownership of the returned data.

The Fetch Alert Status is important when there is a need to switch the bidi data bus's direction. If a Fetch Alert Status is detected, It signifies the memory card's intention to use the bi-directional data bus for the entire duration of the corresponding data transfer. Our memory controller should not schedule any new store command to the memory card. See timing Diagram below for detail.

Memory Status Bus used as a Fetch Alert Indicator

The following diagram shows the detail of the timing relationship between the Memory Command Bus and Memory Status Bus where the status returns a Fetch Alert Indication that fetch data are returning from Memory in 5 cycles based upon current technology and implementation.

System Cycle

```
                         System Cycle 1111111111 2222222222  3333333333
               123456789 0123456789 0123456789  0123456789

Memory Command Bus CCC......  ....................  ..........
                   CCC......  ....................  ..........
                   ..........  ....................  ..........
Memory Status Bus  ..........  ........S...........  ..........
Memory Data Bus    ..........  ..............DDDDDDD DDDDDDDD.

Legend:
C = Active Memory Command Bus for 3 cycles
S = Active Memory Status Bus used as a Fetch Alert Indicator
D = Active Data from Memory
.... = No Activity
```

Data Store Command

Data store commands are issued through the command bus. The first cycle of data on the data bus is lined up with the store command. The memory card will store the first cycle of data from the bidi bus in the quadword (QW) address specified by the quadword's QW ID delivered in the store command. All following quadwords are stored in ascending QW addresses. There is a wrap-around at the top of the 128 byte line, except a command to store 64 bytes.

Delay Transfer and Bidi Management for Store Command

The data bus between the memory controller and memory card is bi-directional. When the memory controller is scheduled to send a store command to the memory card, it needs to raise the Delay Transfer signal and wait for a minimum of 2 cycles from the memory card interface, if there is no Fetch Alert and the data bidi is not transferring data for a previous alert, then at the 4th cycle the processor will own the bidi bus. If there is a Fetch Alert or there is fetched data already in transition, then Delay Transfer signal will be kept active until the data transfer from the memory card has completed and at that time the processor will own the bidi bus.

When the processor owns the bidi bus, the first data cycle is a quiet data cycle by sending all '0' (a low signal level) on the bidi bus to kill the signal reflections. A processor driver will also send an all "0" cycle when the processor finishes the data transfer and changes the bidi bus ownership back to the memory card.

Once the processor sends store data with a store command, the processor drops the Delay Transfer signal after the first cycle of store data. If there is more than one store operation, the processor keeps the Delay Transfer signal active until the first cycle of the last group of data is transferred.

The memory card needs to set the Delay Transfer and bidi bus switch precisely in synchronization with the processor. Otherwise data will collide on bidi bus. It is also true that a Delay Transfer signal suppresses the subsequent fetch alert until all store data transfers are complete. See the next timing diagram for detail.

Timing relationship between the Memory Command Bus and Delay Transfer

The following diagram shows the detail of the timing relationship between the Memory Command Bus and Delay Transfer based upon current technology and implementation.

```
                          System Cycle 1111111111  2222222222
                          123456789 0123456789  0123456789

Memory Command Bus ......CCC  ..........  ..........
                   ......CCC  ..........  ..........
                   ..........  ..........  ..........
Delay Transfer     TTTTTTT..  ..........  ..........
Memory Data Bus    ......DDD DDDDDDDDDD  DDD.......

Legend:
C = Active Memory Command Bus for 3 cycles
D = Active Data from Memory
T = Active Delay Transfer signal to memory card
.... = No Activity
```

Store complete Status

When the store data is put away and the memory card is ready for the next command, a store completion status will be sent back to the memory controller. The cycle of store completion has been timed to provide the earliest cycle that a command at an immediate cycle can be provided against the same bank. See next timing diagram for detail.

Memory Status Bus used as a Store Completion Indicator

Timing relationship between the Memory Command Bus and Memory Status Bus where the status returns a Store Completion Indication based upon the current technology and implementation.

```
                          System Cycle 1111111111  2222222222
                          123456789 0123456789  0123456789

Memory Command     CCC......  ..........  ..........
Bus                CCC......  ..........  ..........
                   ..........  ..........  ..........
```

-continued

```
                          System Cycle 1111111111  2222222222
                       123456789  0123456789  0123456789
Memory Status Bus      .........  ....S.....  ..........
Memory Data Bus        DDDDDDDD   DDDDDDD...  ..........
```

Legend:
C = Active Memory Command Bus for 3 cycles
S = Active Memory Status Bus used as a Store Completion Indicator
D = Active Data from Memory
.... = No Activity While we have described our preferred embodiments of our invention, it will be understood that those skilled in the art, both now and in the future, may make various improvements and enhancements which fall within the scope of the claims which follow. These claims should be construed to maintain the proper protection for the invention disclosed with respect to FIGS. 1 and 2.

What is claimed is:

1. A method for interfacing a memory controller and a memory card of an S/390 architected system, comprising the steps of:

multiplexing signals on a memory status bus between the memory controller and the memory card to service data exchanges as well as provide an indicator of handshaking between the memory controller and the memory card, and using an S/390 Storage Protect Key to indicate storage command acceptance by the memory card whereby if the Storage Protect key is returned, then the command is deemed to be valid and accepted by the memory card even for commands that do not relate to key functions and the Storage Protect key will be used by a processor in the S/390 architecture system for storage validation in accordance with the S/390 architecture and a dummy key at the key response cycle will complete the handshake in the event the command does not relate to key functions.

2. A method according to claim 1 wherein in the event that said memory card detected an error associated with the storage command, it will then return an error response code via the memory status bus.

* * * * *